United States Patent

Abate

Patent Number: 5,264,750
Date of Patent: Nov. 23, 1993

[54] STRAIN ENERGY CONTROL PLANE FOR GENERATOR ROTOR FIELD

[75] Inventor: Victor R. Abate, Waterford, N.Y.

[73] Assignee: General Electric Company, Schenectady, N.Y.

[21] Appl. No.: 899,863

[22] Filed: Jun. 17, 1992

[51] Int. Cl.[5] .............................................. H02K 1/00
[52] U.S. Cl. .................................................... 310/180
[58] Field of Search ................. 310/51, 179, 180, 270, 310/215, 201, 43

[56] References Cited

U.S. PATENT DOCUMENTS

| | | | |
|---|---|---|---|
| 3,546,503 | 12/1970 | Richardson | 310/51 |
| 4,291,249 | 9/1981 | Smith, Jr. et al. | 310/214 |
| 4,330,726 | 5/1982 | Albright et al. | 310/254 |
| 4,377,764 | 3/1983 | Butman, Jr. | 310/260 |
| 4,543,503 | 9/1985 | Kaminski et al. | 310/270 X |
| 4,656,382 | 4/1987 | Moore et al. | 310/270 |
| 4,864,171 | 9/1989 | Khutoretsky | 310/270 X |

Primary Examiner—Steven L. Stephan
Assistant Examiner—E. To
Attorney, Agent, or Firm—Nixon & Vanderhye

[57] ABSTRACT

In a field winding for a rotor (12) in an electrical power generator, a slip plane (36) between the top winding (28) of the rotor and the stack of windings below the top winding to reduce the thermal strain energy in the rotor. The slip plane allows the winding stack to slide underneath the top winding to relieve thermal stress in the stack. Because the top winding is isolated by the slip plane, thermal stresses created in the top winding are confined to the top winding. Similarly, the corners (44) of the end turns (18) for the top winding are wider than the end turn corners of the underlying winding stack. These wide top end turns abut the corner end blocks (46) for the field winding. The winding stack underneath the top turn is free to expand from thermal excitation, because the end turns of the stack are not confined by corner end blocks.

18 Claims, 4 Drawing Sheets

STRAIN ENERGY CONTROL PLANE FOR GENERATOR ROTOR FIELD

TECHNICAL FIELD

This invention relates to electrical power generators. In particular, the invention relates to strain energy control in the rotor field windings of an electrical generator.

BACKGROUND ART

Rotors in industrial electrical power generators undergo high rotational speeds creating large centrifugal forces that stress the rotor. Any imbalances in the rotor will cause vibration. Similarly, the electrical currents in the rotor generate thermal stresses in the rotor field windings. The uneven distribution of these thermal stresses can create mechanical moments that bend and unbalance the rotor. Current created thermal stresses in the rotor can cause the rotor to vibrate.

Rotor field windings carry large currents. Rotors and their windings must withstand substantial thermal strain energy during generator operation. At normal operating speeds, the rotor typically rotates at speeds of 3,600 revolutions per minute (RPM) and faster. In addition, the rotor may have several operating speeds such as 1500, 1800, 3000 and 3600 RPM. Thus, the rotor must be dynamically balanced at several high rotational speeds. Any imbalance in the rotor may destabilize the rotor and cause unwanted vibration. Vibration significantly contributes to the fatigue and wear of the rotor. Moreover, the rotor cannot be safely operated if the vibrations exceed certain relatively low threshold limits.

Thermal vibrations in a generator rotor occur because the large currents carried by the field windings heat and deform the windings and rotor. The currents electrically excite and heat the windings. As they are heated, the windings expand. As the windings expand adjacent turn layers of the winding bind together, and bind against the sides of the rotor slots, the underside of the wedges in the rotor slots, the underside and lip of the retaining rings, and against the end of the end blocks. This thermal expansion of the windings generates slot friction forces principally on the top turn of the winding. Similarly, restraining forces build up as the top turn of the winding stack rubs against steps and discontinuities in the slot and on the retaining ring. The top winding turn experiences most of the thermal stresses generated by the rotor currents. In prior art field windings, these thermal stresses on the top turn propagate through the entire winding stack due to friction between the turns of the winding.

The stresses in the rotor field winding generated by thermal expansion can be categorized into five primary stress mechanisms within the rotor. These stress mechanisms are: (1) the end winding block which abuts against the expanding winding, (2) the coefficient of friction between the retaining ring and the top winding turn, (3) steps and other discontinuities in the inner surface of the retaining rings that bind the top winding turn, (4) the coefficient of friction between the rotor slot and the winding stack, and (5) steps and other discontinuities on the underside of the rotor slot wedges and insulation layer that deform, bind and grind the top winding turn. These stress mechanisms are not entirely predictable and generate stresses in a somewhat random manner. The stresses can vary across the length of the rotor and can vary downward between individual windings in the stack. Moreover, the stresses can also vary between the top turn of the winding and the underlying winding stack.

Prior techniques for overcoming thermal stresses and reducing thermal vibrations in rotors include cooling the rotor, imparting a high flexural stiffness to the rotor, employing body mounted retaining rings that do not engage the rotor spindle, orienting all insulating components of the rotor in 180 degree opposing positions, and coating the upper surface of the top turn. A stiff rotor resists bending and deformation and, thus, dampens thermal vibration in the rotor. Similarly, a body mounted retaining ring effectively stiffens the rotor to reduce the thermal stress sensitivity of the rotor. A body mounted retaining ring also does not transmit bending stresses to the small diameter spindle of the rotor. In addition, orienting the insulating components of the rotor to directly oppose one another theoretically cancels out thermal stresses in the rotor to reduce the bending moments on the rotor. Finally, coating the upper surface of the top winding theoretically allowed the winding to slide with respect to the insulation layers, wedges and retaining rings.

These prior art techniques have their faults. The cooling and high stiffness techniques are practical provided that the rotor always operates below threshold temperatures and stresses. All too frequently, rotors are operated beyond these threshold limits and excessive thermal vibration permanently damages the rotor. Similarly, body-mounted retaining rings cannot be economically retrofitted on older rotors having the traditional retaining rings that mount on the spindle and rotor body. In addition, body-mounted retaining rings add significantly to the cost and complexity of the rotor design.

Opposing insulating components are extremely difficult to design and nearly impossible to maintain over the life of the rotor. Every rotor has unpredictable and random steps and discontinuities at, for example, butt joints and overlaps of insulating materials. Accordingly, it is impossible to design opposing insulating components that have equal but opposite stresses. Similarly, fatigue and creep mechanisms over extended periods of time randomly alter the thermal strain energy and force distribution in the field winding. During its lifetime, the rotor will react to thermal energy and vibration in a random and unpredictable manner.

Similarly, coating the upper surface of the top winding is ineffective because this soft copper surface deforms underneath the insulation layer, slot wedges and retaining rings. The deformities in the upper surface of the top winding bind against the insulation layer. Accordingly, these deformities prevent the top winding from sliding with respect to the insulation layers regardless of any coating between the top winding and the insulation layer.

SUMMARY OF INVENTION

A new technique has been invented to desensitize a generator rotor to stresses from a thermally excited field winding. This technique exploits the physical phenomenon that most of the thermal stress locations are at the top turn of the rotor field winding. The invention mechanically isolates the top winding turn from the underlying winding stack by a friction slip plane.

A slip plane is inserted immediately underneath the top turn of the winding. This slip plane allows the stack of winding turns below the top turn to expand freely when heated. The underside of the top winding remains flat as does the top and bottom surfaces of the windings below the top turn. The deformities impressed into the top surface of the top turn do not extend to the bottom surface of the top turn or to the underlying winding turns. Accordingly, there are no slip impeding deformities in adjacent surfaces of the winding turns, in contrast to the deformity riddled interface between the top turn and wedge insulation layers.

The field winding expands as a uniform stack of windings, except for the top turn that is isolated by the slip plane. Since the bottom stack of windings can expand, strain energy forces do not build up within this stack. There are no substantial thermally-generated forces in this winding stack to deform the windings or rotor, or to cause rotor vibrations. Accordingly, a slip plane below the top winding turn minimizes thermal vibrations in the field winding and rotor.

The top turn of the field winding expands when heated, as does the underlying stack of the winding. Unlike the winding stack, the thermal expansion of the top turn is opposed and, thus, generates thermal stresses in the rotor. Thermal stresses in the top winding turn build up because the top turn is confined by the retaining rings on the ends of the rotor, slot wedges in the tops of the rotor slots and end blocks at the end turns of the field winding. However, the thermal stress in the top turn isolated in that turn and is minor compared to the stresses in prior art winding stacks in which stresses are generated by thermal excitation of the entire winding stack. The present invention should reduce the thermal stresses in the rotor field winding by a factor of (1/N), where N is the number of turns in the winding stack. Thus, the thermal stress in the rotor with a slip plane is a small fraction of the stress in rotors without slip planes.

The slip plane has a low coefficient of friction to allow the winding stack to slide against the top winding turn. The slip plane establishes an upper limit on the maximum strain energy that can build up in the stack. As the stain energy in the stack approaches the friction coefficient of the slip plane, the slip plane allows the stack to slip against the top turn to relieve the strain in the stack.

The slip plane is thin so as not to displace any existing winding turn. The slip plane can be as thin as the insulation covering each winding turn. Because it is thin, the slip plane can be added into existing field windings without modifying the rotor slot or reducing the number of turns in the winding. In addition, the top winding turn remains electrically active even with the slip plane. Accordingly, the slip plane can be added without reducing the electrical capacity or efficiency of the field winding.

In addition, the corner end turns of the windings are modified so that only the top turn abuts against the corner blocks at the ends of the field winding. The top winding turn is wider than the underlying winding stack at the end turn corners. Only the wider top turn corner abuts against the corner block. The stack below the top turn is free to expand lengthwise at the corners. The corner of the top turn adequately secures the entire winding stack from sliding longitudinally in the rotor slot. Accordingly, the winding is secured in the slot and is free to expand, except for the top turn. Widening the corner of the top turn reduces the strain energy forces in the winding stack and reduces the tendency of the winding stack to deform and cause thermal vibration.

The invention relates to a rotor field winding comprising:
a plurality of winding turns coiled in a vertical stack of winding turns, said winding turns positioned in slots in said rotor, and
a slip plane between a pair of adjacent winding turns in said stack.

The invention also relates to a rotor for a power generator comprising:
a cylindrical rotor having a surface with longitudinal slots;
at least one rotor field winding in a corresponding pair of said longitudinal slots, said rotor field winding comprising a plurality of winding turns coiled in a vertical stack, said winding turns including end turns extending longitudinally out from said rotor;
at least one winding turn of said stack having wide end turns wider than the end turns of the other winding turns in said stack, and
a block secured with respect to said rotor longitudinally abutting said wide end turns.

It is an object of the present invention to reduce the tendency for thermal vibration in a rotor of an electrical generator. In particular, it is an object of this invention to incorporate a slip plane immediately below the top turn of the windings in the rotor slots to limit the strain energy in the rotor and field winding. Similarly, it is an object of this invention to block the end of the top turn and not the underlying end turns to reduce the strain energy in the windings.

DESCRIPTION OF THE DRAWINGS

This invention is clearly shown in the accompanying drawings in which.

DETAILED DESCRIPTION OF THE INVENTION

Figure 1:
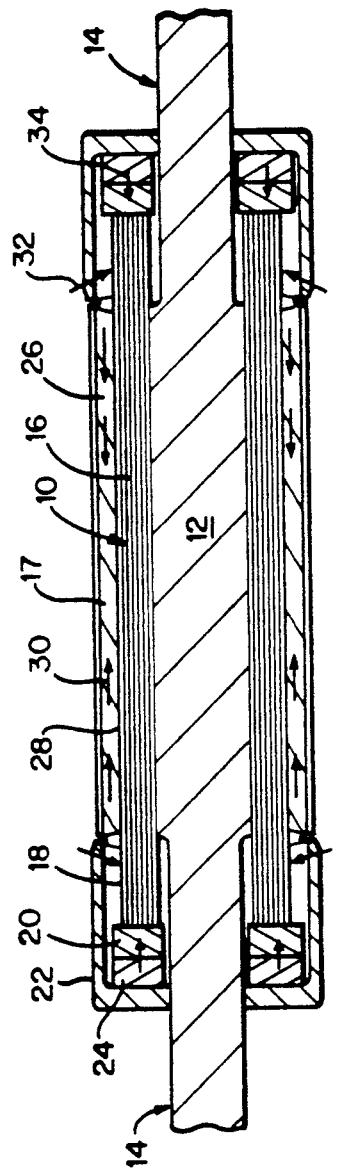
FIG. 1 is a schematic drawing in cross section of a prior art rotor illustrating the stain energy forces acting on the field winding.

FIG. 1 illustrates the strain forces acting on a traditional rotor field winding (10). The rotor (12) is supported within the generator by spindles (14) having a narrower diameter than the rotor itself. The windings are mounted in slots (16) extending longitudinally in the rotor. The windings are generally a rectangular stack of winding turns each turn having a pair of long legs and a pair of short legs (end turns). The long legs of the winding sit in a respective pair of slots in the rotor. A slot wedge (17) caps the top of each slot to hold the windings in the slot. This slot wedge is separated by a few layers of insulation from the top turn of the winding. The other winding turns are directly below the top turn, but do not directly contact the slot wedge.

The end turns (short legs) (18) of the field winding extend beyond the main portion of the rotor and overhang the spindle (14). The end turns are held in place by end winding blocks (20) and the retaining rings (22). The retaining rings are traditionally mounted directly onto the spindle (14) and overlap the the ends of the rotor. The retaining rings provide an outer annular casing for the end turns of the windings and prevent the end turns from bending outward under the strong centrifugal forces created by the high rotational speed of the rotor. As with the slot wedges, only the top turn of the windings contact the retaining ring.

Similarly, the end blocks (20) abut the outer edge of the end turns to hold the field winding longitudinally in place. The end blocks are themselves held in place by the centering ring (24) mounted within the retaining ring. The end blocks in prior art rotors abut the entire stack of the end turns in the winding. In the preferred embodiment of the present invention, the end blocks at the corners of the end turns only abut the top turn of the end turn winding.

As shown in FIG. 1, strain energy from thermal stresses in the field winding arises from various sources. The friction between the slot wedge (26) and the top winding turn (28) generate longitudinal slot friction forces (30) that act on the top turn of the winding. The magnitude of these slot friction forces vary along the length of the winding due to irregularities and discontinuities in the abutting surfaces of the slot wedge and the top winding turn. Similarly, the lip of the retaining ring imparts a large friction force (32) where the lip clamps down on the top turn of the winding.

In rotor windings without the inventive slip plane, friction forces are distributed through the stack of the winding. These friction forces are unbalanced and, thus, cause the winding and rotor to bend. This bending unbalances the rotor causing potentially-damaging thermal vibration in the rotor.

In addition to the forces imparted along the top turn of the winding, external forces (34) are applied to the outer edges of the end turns (18). The end winding blocks (20) that hold the windings against longitudinal movement inherently apply forces to the ends turns of the winding. These opposing forces on the end turns contribute to the thermal strain energy in the field windings and rotor. In prior art windings without a slip plane or a top turn winding having a widened end turn, these end winding forces are distributed throughout the winding layers of the winding stack and contribute to the thermal strain energy in the winding.

Figure 2:
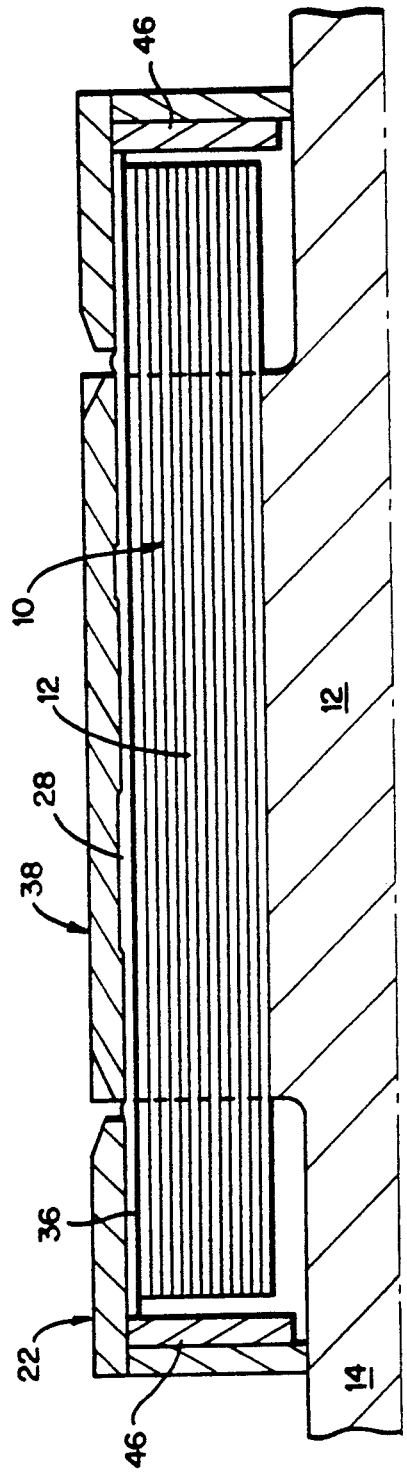
FIG. 2 is a cross-sectional drawing of a portion of a rotor that shows one length of a winding stack.
Figure 3:
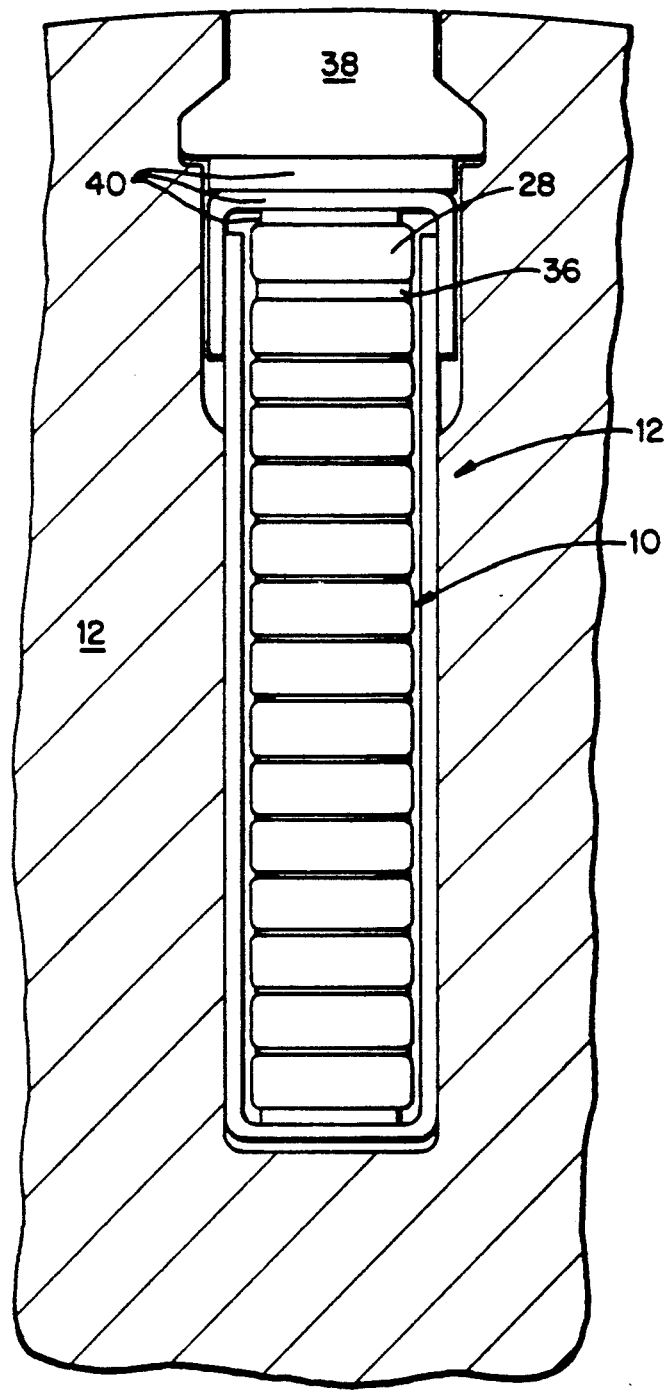
FIG. 3 is a cross section of a rotor slot and winding.

FIGS. 2 and 3 show a field winding (10) having a slip plane (36) underneath the top turn (28) of the winding. The thickness of the slip plane is 0.015 to 0.050 inches in the preferred embodiment which is about the same thickness as is the insulation covering on the windings. The slip plane is made of a high strength material with a low coefficient of friction. Examples of materials suited for the slip plane are glasses, glasses impregnated with TEFLON, and high strength graphite coated with TEFLON. TEFLON is a tetrafluoroethylene (TFE) fluorocarbon polymer. In the preferred embodiment, the coefficient of friction between the winding turns and the slip plane is less than 0.05.

The turns of the winding (10) are stacked together in a semi-rectangular shaped coil. The winding stack sits in longitudinal slots in the rotor (12). The rotor slots are deep and narrow to receive the winding stack. Near the surface of the rotor and above the stack winding, the rotor slot is capped with a wedge (38) that holds the winding in the slot. There are a few layers of insulation (40) between the wedge and the top turn (28) of the field winding.

The top turn of the winding is in contact with the insulation layers above it. The inevitable bumps, steps, and discontinuities in the top winding grind against the insulation and wedge as the field winding is energized and heated.

Figure 4:
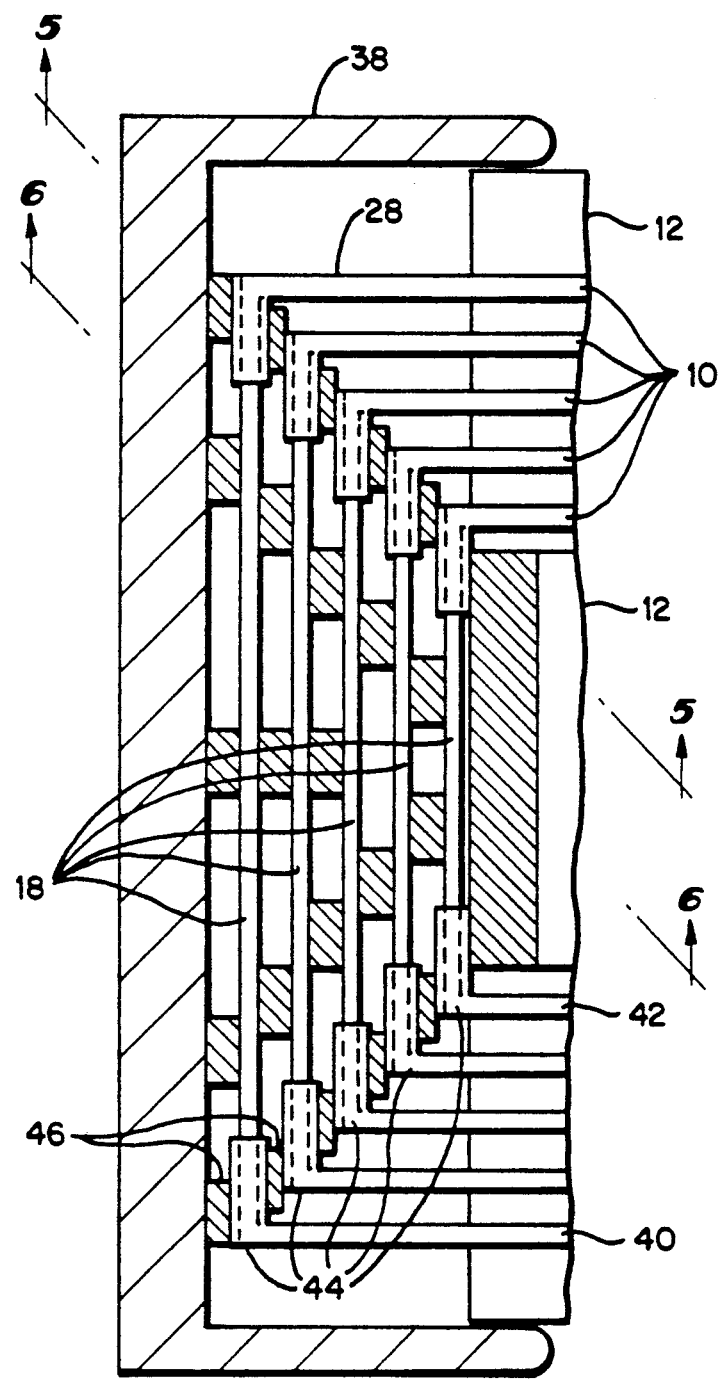
FIG. 4 is a partial cross-sectional drawing of the win end turns and end of the rotor.
Figure 5:
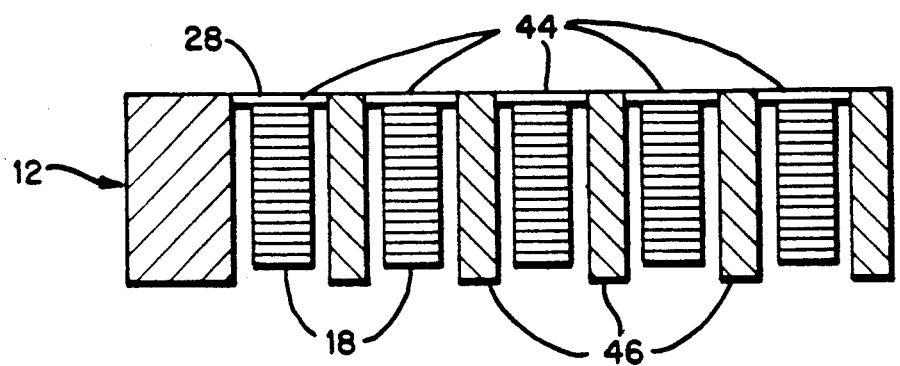
FIG. 5 is a sectional drawing of the winding end turns along diagonal line 5—5 of FIG. 4.
Figure 6:
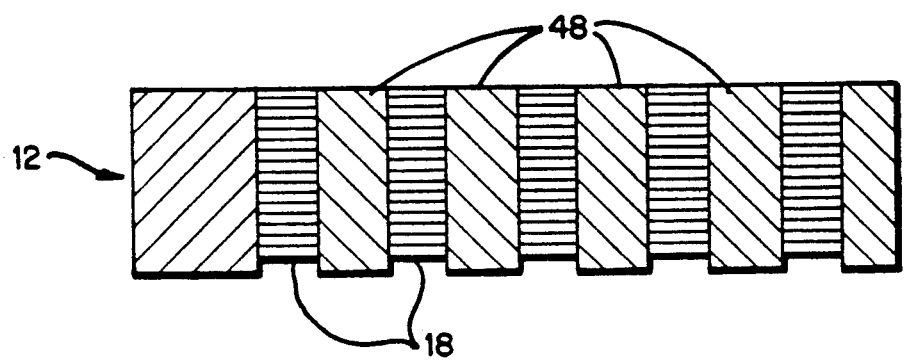
FIG. 6 is a sectional drawing of the winding end turns taken along diagonal line 6—6 of FIG. 4.

As shown in FIGS. 4 to 6, the end turn sections (18) of the field windings extend beyond the rotor and overhang the spindle of the rotor. The end turn sections of the windings connect the winding section in one rotor slot to the corresponding section of the winding in another rotor slot. The end turns run generally perpendicular to the rotor axis. The end turn section is held in place by the retaining ring (38) that slide onto the ends of the rotor.

The end turn section of successive windings are staggered from the widest winding (40) to the narrowest winding (42). At the corners (44) of each end turn, the top winding (28) is wider than the underlying windings in the winding stack. This wide corner of the top winding end turn abuts against the corner blocks (46) between the staggered end turns. Similarly, the narrowest winding (42) has a wide end turn corner that contacts the end of the rotor (12).

The abutment between the top turn and the corner block holds the top turn and to an extent the underlying windings laterally in position within the rotor slot. Because the winding stack underneath the top turn does not abut the corner blocks, these underlying winding turns are free to thermally expand longitudinally at the corners of the end turns. Thus, the windings can thermal expand longitudinally within the rotor slots and avoid thermal stresses in the slot.

To ensure that the entire winding stack at the end turns is adequately supported over the rotor spinal, the distance blocks (48) abut the entire winding stack at several sections along the end turns other than at the corners. The top winding turn is wider than the rest of the winding stack only at the corner of the end turns. Away from these corners, the top winding is the same width as is the underlying winding stack. Accordingly, the distance blocks engage the entire winding stack in the end turns. Since these distance blocks are away from the corner section of the end turns where thermal expansion are greatest, the distance blocks can engage the entire field winding without unduly creating thermal stresses within the winding.

The invention has been described in what is currently considered to be its preferred embodiment. This invention is not limited to the disclosed embodiment. Rather, the invention covers the various modifications and equivalent arrangements included within the spirit and scope of the appended claims.

What is claimed is:

1. In a rotor for a power generator, a rotor field winding comprising:
    a plurality of winding turns coiled in a radial stack of winding turns, said winding turns positioned in slots in said rotor, and
    a slip plane between a pair of adjacent winding turns in said stack.

2. A rotor field winding as in claim 1 wherein said slip plane substantially covers a surface on one of said adjacent winding turns.

3. A rotor field winding as in claim 1 wherein said adjacent winding turns includes the winding turn in said stack nearest a surface of said rotor.

4. A rotor field winding as in claim 1 wherein said adjacent winding turns are in a portion of said stack near a surface of said rotor.

5. A rotor field winding as in claim 1 wherein said slip plane as a friction coefficient with said adjacent winding turns of less than 0.05.

6. A rotor field winding as in claim 1 wherein said slip plane comprises a high strength material with a low coefficient of friction.

7. A rotor field winding as in claim 1 wherein said slip plane is a material comprising a glass.

8. A rotor field winding as in claim 7 wherein said glass is impregnated with a tetrafluoroethylene fluorocarbon polymer.

9. A rotor field winding as in claim 1 wherein said slip plane is a material comprising a graphite coated with a tetrafluoroethylene fluorocarbon polymer.

10. A rotor for a power generator comprising:
a cylindrical rotor section having a surface with longitudinal slots:
at least one rotor field winding in a corresponding pair of said longitudinal slots, said rotor field winding comprising a plurality of winding turns coiled in a radial stack, said winding turns including end turns extending longitudinally out from said rotor section;
at least one winding turn of said stack having at least one wide end turn section wider than end turn sections of the other winding turns in said stack radially aligned with said wide end turn section, and
a block abutting said wide end turn section.

11. A rotor as in claim 10 wherein wide end turn section is wide at a corner of said end turns in line with said winding turns in said slots.

12. A rotor as in claim 10 wherein said at least one winding turn having and wide end turn section is the winding turn nearest the surface of said rotor.

13. A rotor as in claim 10 wherein said at least one winding turn having said wide end turn section is separated from the other winding turn by a slip plane between adjacent winding turns in said stack.

14. A rotor for a power generator comprising:
a cylindrical rotor having a surface with longitudinal slots;
at least one rotor field winding in a corresponding pair of said longitudinal slots, said rotor field winding comprising a plurality of winding turns coiled in a vertical stack, said winding turns including end turns extending longitudinally out from said rotor;
a slip plane between adjacent pairs of winding turns in said stack;
at least one winding turn of said stack having wide end turns having corners wider than the corners of the end turns of the other winding turns in said stack, and
a block secured with respect to said rotor longitudinally abutting said wide end turns.

15. A rotor for a power generator as in claim 14 wherein said slip plane is immediately underneath the winding turn nearest the rotor surface.

16. A rotor for a power generator as in claim 14 wherein said slip plane is immediately underneath the winding turn nearest the rotor surface and is made of a material comprising glass.

17. A rotor for a power generator as in claim 14 wherein said slip plane is immediately underneath the winding turn nearest the rotor surface and is made of a material comprising graphite coated with a tetrafluoroethylene fluorocarbon polymer.

18. A rotor for a power generator as in claim 14 wherein said slip plane is immediately underneath the winding turn nearest the rotor surface and said one winding turn is said winding turn nearest the rotor surface.

* * * * *